(No Model.)

L. A. ASPINWALL.
DUMMY COMB FOR BEEHIVES.

No. 540,479. Patented June 4, 1895.

Witnesses
Chas. H. Smith
Geo. T. Pinckney

Inventor
L. A. Aspinwall
per Lemuel W. Serrell
Atty.

UNITED STATES PATENT OFFICE.

LEWIS AUGUSTUS ASPINWALL, OF JACKSON, MICHIGAN, ASSIGNOR TO THE ASPINWALL MANUFACTURING COMPANY, OF SAME PLACE.

DUMMY COMB FOR BEEHIVES.

SPECIFICATION forming part of Letters Patent No. 540,479, dated June 4, 1895.

Application filed July 23, 1894. Serial No. 518,377. (No model.)

*To all whom it may concern:*

Be it known that I, LEWIS AUGUSTUS ASPINWALL, a citizen of the United States, residing at Jackson, in the county of Jackson and State of Michigan, have invented an Improved Dummy Comb for Beehives, of which the following is a specification.

In the care of bees, I have found that when the population of the colony becomes crowded, there is a tendency to swarm, and this is temporarily prevented by increasing the room for the formation of honey comb, but this expedient is speedily neutralized because the brood increases, and when the comb in such increased space is filled, the tendency to swarm is augmented.

I have discovered that by the insertion into a bee-hive of a dummy comb having holes without any bottom or middle wall, standing room is given for the bees and no attempt will be made to complete the comb in consequence of the dummy having neither middle wall nor bottom to the cells. This dummy comb increases the accommodation for the bees but there is no increase in the capacity of the hive for breeding or for the storage of honey in the brood department. In this manner the bee keeper is enabled to secure much larger returns of honey and no uneasiness is experienced with reference to swarming.

In carrying out my invention I introduce into the bee-hive dummy combs alternately with the frames that receive the ordinary brood combs and honey, so that double the standing room is provided for the bees, and I provide at the ends of the dummy combs, passages through which the queen bee, workers and drones can pass from comb to comb in order that the travel of the queen bee from one comb to another and the maintaining of the proper supply of eggs for regular breeding purposes may not be interfered with.

Figure 1:
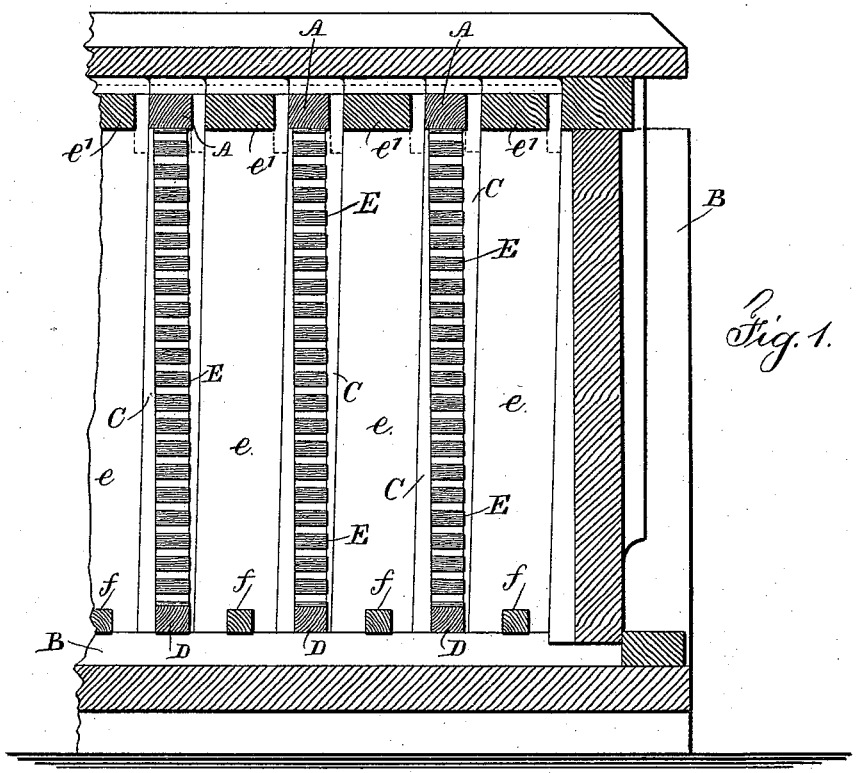
Figure 2:
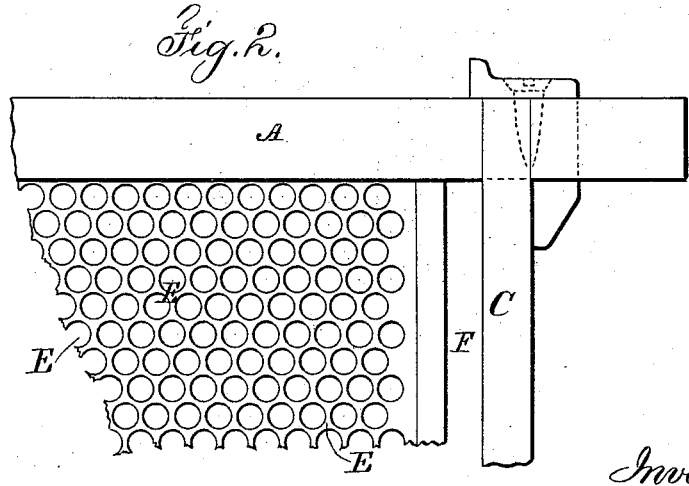

In the drawings, Figure 1 is a vertical section showing a portion of a beehive with the dummy combs in position between the frames that receive the honey-combs and honey. Fig. 2 is an elevation in larger size of a portion of one of the dummy combs.

The hive is to be of any desired character. I have represented the dummy comb as adapted to be received into a hive constructed similar that shown in my Patent No. 493,466, granted March 14, 1893, in which the comb frames are suspended from the top, and to adapt the dummy comb to the character of hive illustrated in said patent, I employ a top bar A that rests at its ends upon the end pieces B of the hive, and the side pieces C hang from the top bar A and they are connected at their lower ends by a bottom bar D, and the dummy combs E are received between the top bar A and bottom bar D and supported by them. These dummy combs E are preferably made of wood bored through and through and parallel with the grain of the wood, so as to form cells that are open and without any middle or bottom to the cells, so that these dummy combs are adapted to give standing room for the bees, but because there are no middle walls or bottom to the cells, the bees will not attempt to deposit honey in them, and between the side pieces C and the ends of the dummy comb there are openings at F that are sufficiently large for the queen bee and the workers and drones to pass from one comb to the next.

I find it advantageous to make use of the dummy combs and their supporting frames alternating with the ordinary frames similar to those shown in my aforesaid patent, the same having the top bars e' and the lower bars f and the end pieces e, so that upon these hanging frames the bees may deposit the honey and make the comb as usual.

Any desired number of these dummy combs can be introduced into the hive or they may be removed from time to time, especially when it is desired to promote swarming.

I find it advantageous to make the dummy comb of a layer of wood sawed crosswise of the grain and bored with holes about the same in size as the holes in an ordinary honey comb, such holes passing entirely through the layer of wood, and this is advantageously dipped into melted bees-wax or paraffin in order that the wood may be saturated. I however do not limit myself to the dummy comb formed by boring the same with numerous holes, as standing room may be furnished for the bees by a dummy comb made of numerous thin slats closely adjacent to each other, these dummy combs being introduced between the frames that receive the honey combs.

I claim as my invention—

1. As a new article of manufacture, a dummy comb for bee-hives, composed of a layer of wood or other material with holes passing through and through the same of a size adapted to receive the bees and furnish standing room, substantially as set forth.

2. As a new article of manufacture, a dummy comb for bee-hives, composed of a layer of wood or other material with holes passing through and through the same of a size adapted to receive the bees and furnish standing room, and having a supporting frame, there being spaces between the frame and the dummy comb for the passage of the queen, workers and drones, substantially as set forth.

3. The combination in a bee-hive with the frames for the ordinary combs, of dummy combs introduced between the ordinary combs and having openings through them to give standing room for the bees without affording facility for the formation of comb or the deposit of honey and to lessen the risk of swarming substantially as specified.

Signed by me this 11th day of July, 1894.

L. AUGS. ASPINWALL.

Witnesses:
WALTER ALEXANDER,
C. G. ROWLEY.